US012629876B2

(12) United States Patent
Schipper et al.

(10) Patent No.: US 12,629,876 B2
(45) Date of Patent: May 19, 2026

(54) COMPOUNDING EXTRUDER FOR PRODUCING POLYPROPYLENE COMPOSITION

(71) Applicant: SABIC GLOBAL TECHNOLOGIES B.V., Bergen op Zoom (NL)

(72) Inventors: Ronald Julianus Peter Schipper, Brunssum (NL); Christelle Marie Helene Grein, Aachen (DE); Cristina Rodriguez Iglesias, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 99 days.

(21) Appl. No.: 18/031,952

(22) PCT Filed: Oct. 19, 2021

(86) PCT No.: PCT/EP2021/078972
§ 371 (c)(1),
(2) Date: Apr. 14, 2023

(87) PCT Pub. No.: WO2022/090005
PCT Pub. Date: May 5, 2022

(65) Prior Publication Data
US 2023/0382037 A1     Nov. 30, 2023

(30) Foreign Application Priority Data
Oct. 26, 2020     (EP) ..................................... 20203763

(51) Int. Cl.
*B29C 48/385*     (2019.01)
*B29C 48/505*     (2019.01)
*B29K 23/00*     (2006.01)

(52) U.S. Cl.
CPC .......... *B29C 48/385* (2019.02); *B29C 48/507* (2019.02); *B29C 2948/9239* (2019.02); *B29K 2023/12* (2013.01)

(58) Field of Classification Search
CPC ................ B29C 48/385; B29C 48/507; B29C 2948/9239; B29C 48/05; B29C 48/767;
(Continued)

(56) References Cited

U.S. PATENT DOCUMENTS 4,399,054 A     8/1983   Ferraris et al.
4,472,524 A     9/1984   Albizzati
(Continued)

FOREIGN PATENT DOCUMENTS

AT     307012 B     5/1973
CN     101671412 B     3/2010
(Continued)

OTHER PUBLICATIONS

International Search Report for International Application No. PCT/EP2021/078972, International Filing Date Oct. 19, 2021, Date of Mailing Feb. 9, 2022, 6 pages.
(Continued)

*Primary Examiner* — Galen H Hauth
*Assistant Examiner* — Mohamed K Ahmed Ali
(74) *Attorney, Agent, or Firm* — CANTOR COLBURN LLP

(57) ABSTRACT

A compounding extruder includes a melting section having a first cylindrical tube having a first inlet to receive a propylene polymer and a first outlet to discharge a first melt composition and a first screw arranged in the first cylindrical tube and having a first length, a first outer screw diameter Do1 and a first inner screw diameter to convey the propylene polymer and to the first outlet and a mixing section comprising a second cylindrical tube having a second inlet to
(Continued)

receive, the first melt composition from the first outlet, an end having a second outlet and a side inlet between the second inlet and the second outlet to receive a further component, and a second screw arranged in the second cylindrical to convey the first melt composition and the further component to the second outlet, wherein Do1 is 0.82 to 1.2×Do2.

13 Claims, 1 Drawing Sheet

(58) Field of Classification Search
    CPC ..... B29B 7/426; B29B 7/7461; B29B 7/7485; B29B 7/86
    See application file for complete search history.

(56) References Cited

U.S. PATENT DOCUMENTS

| | | | |
|---|---|---|---|
| 5,017,714 | A | 5/1991 | Welborn, Jr. |
| 5,324,820 | A | 6/1994 | Baxter |
| 6,280,667 | B1 * | 8/2001 | Koenig ................. B29C 48/832 |
| | | | 264/173.17 |
| 6,399,709 | B1 * | 6/2002 | Moriguchi .............. B29C 48/38 |
| | | | 525/240 |
| 12,037,470 | B1 * | 7/2024 | Bhargava ................. B29C 48/29 |
| 2006/0245294 | A1 * | 11/2006 | Burkhardt ............... B29C 48/37 |
| | | | 366/85 |
| 2007/0112099 | A1 * | 5/2007 | Wade ................... B29C 48/625 |
| | | | 523/337 |
| 2008/0019212 | A1 * | 1/2008 | Dietz ..................... B29C 48/67 |
| | | | 366/97 |
| 2020/0087431 | A1 | 3/2020 | Lecouvet et al. |
| 2020/0172707 | A1 | 6/2020 | Van Mierloo et al. |
| 2020/0180202 | A1 * | 6/2020 | Grisot-Saule .......... C09J 201/10 |
| 2020/0325319 | A1 | 10/2020 | Voets et al. |
| 2023/0302705 | A1 | 9/2023 | Schipper et al. |
| 2023/0415379 | A1 | 12/2023 | Schipper et al. |

FOREIGN PATENT DOCUMENTS

| | | | | |
|---|---|---|---|---|
| CN | 102120345 | B | 7/2011 | |
| CN | 209191246 | U | 8/2019 | |
| EP | 2995436 | A1 * | 3/2016 | ........ B29B 17/0026 |
| JP | H0976327 | A | 3/1997 | |
| JP | 2012025153 | A | 2/2012 | |
| WO | 2006010414 | A1 | 2/2006 | |

OTHER PUBLICATIONS

Peacock Andrew J., "Handbook of Polyethylene", Chapter 3 Production Processes, 2000, Marcel Dekker, Inc., New York; ISBN 0824795466; p. 43-66.

Sasimowski, E., et al. "Influence of the Conditions of Corotating Twin-Screw Extrusion for Talc-Filled Polypropylene on Selected Properties of the Extrudate" Polymers 2019, 11, 1460, 18 pages.

Ser van der Ven, "Polypropylene and other Polyolefins: Polymerization and Characterization," Studies in Polymer Science 7, Elsevier (1990), pp. 1-11.

Written Opinion for International Application No. PCT/EP2021/078972, International Filing Date Oct. 19, 2021, Date of Mailing Feb. 9, 2022, 8 pages.

* cited by examiner

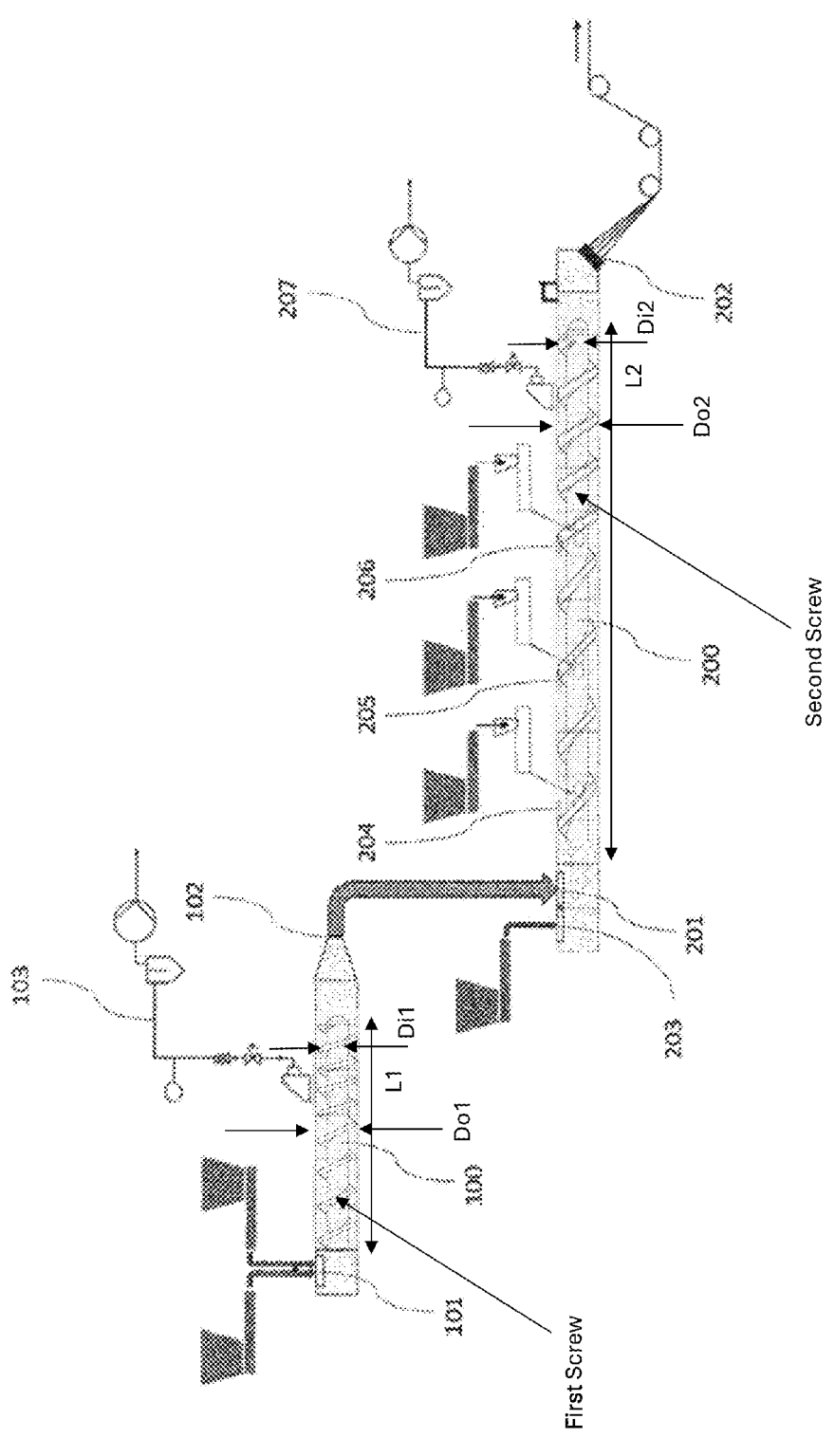

COMPOUNDING EXTRUDER FOR PRODUCING POLYPROPYLENE COMPOSITION

CROSS REFERENCE TO RELATED APPLICATIONS

This application is a National Stage application of PCT/EP2021/078972, filed Oct. 19, 2021, which claims the benefit of European Application No. 20203763.6, filed Oct. 26, 2020, both of which are incorporated by reference in their entirety herein.

BACKGROUND

The present invention relates to a compounding extruder for producing a polypropylene composition.

A polypropylene composition is generally made by melt-mixing pellets of polypropylene with further components such as additives and fillers using a compounding extruder. This is typically performed in a compounding extruder comprising a melting section wherein the polymer is added and melted and a mixing section in which the melted polymer is mixed with the further components. A screw extends over the melting section and the mixing section, which performs both the melting and the mixing. The mixing section is typically followed by a venting section and a degassing section. Finally a melt of a homogeneous polymer composition is extruded from the extruder.

Polymers 2019, 11, 1460, "Influence of the Conditions of Corotating Twin-Screw Extrusion for Talc-Filled Polypropylene on Selected Properties of the Extrudate" uses a conventional compounding extruder and studies the effect of various parameters on the properties of the talc-filled polypropylene obtained by the extruder. In Conclusions (p. 16), this document mentions the negative influence of large screw speed on the polymer properties by polymer degradation.

The known way of the production of a polypropylene composition has a problem that increasing the throughput by applying a higher screw speed leads to the degradation of the properties of the obtained polymer composition. For example, the polypropylene composition produced at a high throughput may have lower mechanical properties and/or flame retardancy.

Further, it has been a challenge to obtain a polypropylene composition with a reduced smell. Polypropylene compositions tend to have various types of unpleasant smell which is particularly undesirable in consumer applications, e.g. automotive interior parts like instrument panels.

SUMMARY

It is an object of the present invention to provide a compounding extruder for producing a propylene-based polymer composition in which the above-mentioned and/or other problems are solved.

Accordingly, the invention provides a process for producing a propylene-based polymer composition using a compounding extruder comprising a) a melting section comprising
  ai) a first elongated cylindrical tube having
    an end portion having a first inlet port configured to receive, in operation, a propylene-based polymer and optional additives and
    an end portion having a first outlet port configured to discharge, in operation, a first melt composition comprising a melt of the propylene-based polymer and the optional additives and
  aii) a first screw arranged in the first elongated cylindrical tube and having a first length L1, a first outer screw diameter Do1 and a first inner screw diameter Di1 configured to, in operation, convey the propylene-based polymer and the optional additives to the first outlet port and b) a mixing section comprising
  bi) a second elongated cylindrical tube having
    an end portion having a second inlet port configured to receive, in operation, the first melt composition from the first outlet port,
    an end portion having a second outlet port and
    a side inlet port between the second inlet port and the second outlet port configured to, in operation, receive a further component,
    wherein the second outlet port is configured to discharge, in operation, a second melt composition comprising the first melt composition and the further component and
  bii) a second screw arranged in the second elongated cylindrical tube and having a second length L2, a second outer screw diameter Do2 and a second inner screw diameter Di2 configured to, in operation, convey the first melt composition and the further component to the second outlet,
wherein the first screw and the second screw are operable at different screw speeds, wherein Do1 is 0.82 to 1.2×Do2.

BRIEF DESCRIPTION OF THE DRAWINGS

The FIGURE illustrates an embodiment of the disclosed compounding extruder, which comprises a melting section 100 and a mixing section 200.

DETAILED DESCRIPTION

The invention is based on the realization that the melting of the polypropylene and the mixing of the polypropylene melt and the further component require different conditions for optimal results. The melting of the polypropylene is advantageously performed at a large screw speed for obtaining fast melting and a high throughput. However, it was realized that performing the mixing at a large screw speed may degrade the further component to be mixed with the polypropylene. This is especially the case for large diameter extruders.

The inventors have realized that different optimum conditions can be applied for melting and mixing by using different screws for melting and mixing, which screws are operable at different speeds. The melting may be performed using a screw operated at a larger screw speed and the mixing may be performed using a screw operated at a smaller screw speed.

The small screw speed in the mixing section results in gentle mixing and a long residence time which both allows for a better mixing of the propylene-based polymer with the further component. The small screw speed in the mixing section further prevents breaking and heat degradation of components sensitive to mechanical stress or heat. This was found to result in improvements in the various properties of the obtained composition, such as smell, mechanical properties and/or flame retardancy.

Further, the dimensions of the first screw and the second screw are optimized according to the invention to allow the first screw and the second screw to be operated such that a high throughput is obtained while avoiding disadvantages related to a too high screw speed.

Further, the invention offers a great degree of flexibility in preparing a wide variety of polypropylene compositions. A wide variety of polypropylene compositions can be prepared by varying the screw speeds of the first screw and the second screw, instead of designing different screws for different polypropylene compositions.

The mixing section has a side inlet port between the second inlet port and the second outlet port, thus the side inlet port is downstream of the second inlet port for receiving the first melt composition. This position of the side inlet port leads to particularly good properties of the obtained composition, especially when the side inlet port is fed with glass fibers. The addition of glass fibers upstream of the inlet port for receiving the melt composition leads to the reduction of the length of the glass fibers, which decrease the properties of the final composition. Further, the addition of fillers such as talc upstream of the inlet port for receiving the melt composition increases the damage to the screw due to the abrasion with the fillers.

It is noted that US20060245294 describes a method of melting and homogenizing multimodal or bimodal polyolefins in a first extruder and a second extruder which is disposed downstream thereof in a conveying direction, wherein a higher shear rate prevails in the first extruder than in the second extruder. According to US20060245294, a homogeneous multimodal or bimodal polyolefins are obtained. US20060245294 does not relate to a compounding process in which a polymer is mixed with further components. US20060245294 does not disclose feeding a further component from a side feeder of the second extruder. US20060245294 mentions that the ratio of the outside diameter of the first screw to the outside diameter of the second screw should be 0.3 to 0.8.

It is further noted that EP2995436 discloses a method for producing a filled polymeric composite material which contains a polymeric carrier material and a fiber material as a filling material. The device comprises a first extrusion apparatus, which has an inlet for the polymeric carrier material and an outlet for the melted polymeric carrier material, a melt-processing apparatus connected to the outlet of the first extrusion apparatus, and a second extrusion apparatus. The second extrusion apparatus has a melt inlet, which is connected to the exit of the melt-processing apparatus, and a fiber material inlet for the fiber material. The fiber material inlet of EP2995436 is arranged upstream of the melt inlet, as opposed to the present invention which requires a side inlet port between the inlet port and the outlet port of the mixing section. EP2995436 also does not address the problem of achieving a higher throughput and good properties of the propylene-based polymer composition.

Extruder

The compounding extruder according to the invention comprises a) a melting section and b) a mixing section. The mixing section is disposed downstream of the melting section in a conveying direction.

The melting section comprises ai) a first elongated cylindrical tube and aii) a first screw arranged in the first elongated cylindrical tube.

The first elongated cylindrical tube has an end portion having a first inlet port and an end portion having a first outlet port. The first inlet port is configured to receive, in operation, a propylene-based polymer and optionally additives. The first inlet port is configured to optionally receive, in operation, a further polymer.

The first screw is configured to, in operation, convey the propylene-based polymer and the optional additives and the optional further polymer to the first outlet port. In operation, the propylene-based polymer is melted as it is conveyed to the first outlet port. The first outlet port is configured to discharge, in operation, a first melt composition comprising a melt of the polymer and the optional additives and the optional further polymer.

The first elongated cylindrical tube may be provided with a vacuum degassing section between the first inlet port and the first outlet port.

The discharged first melt composition is transferred to the melting section e.g. by a heated transition piece.

The melting section comprises bi) a second elongated cylindrical tube and bii) a second screw arranged in the second elongated cylindrical tube.

The second elongated cylindrical tube has an end portion having a second inlet port and an end portion having a second outlet port. The second inlet port is configured to receive, in operation, the first melt composition from the first outlet port. The second elongated cylindrical tube further has a side inlet port between the second inlet port and the second outlet port configured to, in operation, receive a further component.

The second screw is configured to, in operation, mix and convey the first melt composition and the further component to the second outlet port. The second outlet port is configured to discharge, in operation, a second melt composition comprising the first melt composition and the further component.

The second elongated cylindrical tube may be provided with a vacuum degassing section between the side inlet port and the second outlet port.

The first screw has a first length L1, a first outer screw diameter Do1 and a first inner screw diameter Di1. The second screw has a second length L2, a second outer screw diameter Do2 and a second inner screw diameter Di2. The first screw and the second screw are operable at different screw speeds.

In the compounding extruder according to the invention, the first screw is operable at a larger screw speed than the second screw. The screw designs of the first screw and the second screw are selected such that the mixing section can handle the input from the melting section and any input from the side inlet port.

Further, the dimensions of the first screw and the second screw are optimized according to the invention such that a high throughput is obtained while avoiding disadvantages related to a too high screw speed.

The throughput of an extruder depends, among others, on the screw speed and the free volume in the extruder.

A higher screw speed of the first screw results in a higher throughput. However, if the first screw is operated at a very large screw speed, degradation of the propylene-based polymer and other components added to the first extruder may occur. Further, the temperature of the first melt composition entering the mixing section may become so high that the further components added to the second extruder (e.g. flame retardant) degrades.

A larger free volume in the first screw results in a higher throughput. A larger free volume in the extruder is obtained by a larger outer screw diameter as well as a larger ratio between the outer screw diameter and the inner screw diameter.

For melting of a polymer, typically extruders are used with lower diameter ratios. Because of the lower diameter ratio, the specific torque level of these extruders is higher since more 'metal' as construction material is available in the screws to handle these high levels of torque. More torque means more power to melt polymer, which in turn results in a more throughput during melting. Also the lower diameter ratio makes melting more efficient since the average overall shear rate is the highest when the diameter ratio is the lowest.

According to the present invention, the first screw has a relatively large outer diameter to increase the available free volume such that a high throughput can be achieved while the screw speed of the first screw can be set to a moderate level. According to the present invention, the first outer screw diameter Do1 is close to the second outer screw diameter Do2, i.e. Do1 is 0.82 to 1.2×Do2. Accordingly, the first screw has a free volume which is slightly larger, equal to or slightly smaller than the second screw, instead of a free volume which is much smaller than the second screw. This allows the first screw to be operated at an optimum screw speed which is higher than that of the second screw and high enough for a high throughput while not being too high to cause degradation.

Preferably, Do1 is at least 0.85×Do2. Preferably, Do1 is at most 1.0×Do2.

Preferably, Do1 is 0.85 to 1.2×Do2 or Do1 is 0.82 to 1.0×Do2. More preferably, Do1 is 0.85 to 1.0×Do2.

Preferably, Do1/Di1=0.8 to 1.0×Do2/Di2. This helps the first screw to be operated at an optimum screw speed while allowing the mixing section to handle the input from the melting section and any input from the side inlet port. Very preferably, Do1 is 0.82 to 1.2×Do2 and Do1/Di1=0.8 to 1.0×Do2/Di2.

Preferably, Do1/Di1 is 1.4 to 2.1. Preferably, Do2/Di2 is 1.4 to 2.1.

The length of the first screw is not critical and may be low. For example, L1/Do1 may be 10 to 100, preferably 14 to 24.

The length of the second screw is preferably large to allow a long residence time. Preferably, L2/Do2 is larger than L1/Do1. Preferably, L2/Do2 is 30 to 100.

Each of the melting section and the mixing section may be configured as a single screw extruder or a twin screw extruder. A twin screw extruder has a higher mixing capability than a single screw extruder while having a higher risk of causing degradation to the component being processed, particularly when the component is glass fibers.

In some embodiments, at least the mixing section is configured as a twin screw extruder. According to the present invention, the side inlet port is positioned between the second inlet port and the second outlet port of the mixing section, which reduces the risk of the degradation of the further component to be mixed compared to the further component being added upstream of the second inlet port. Accordingly, in these embodiments, a higher mixing capability is obtained while having a low risk of degradation to the further component added to the side inlet port.

The compounding extruder according to the invention may advantageously be used in a process comprises the step of:

A) feeding the propylene-based polymer and the optional additives to the first inlet and discharging the first melt composition from the first outlet, wherein the first screw is operated at a first screw speed and B) feeding the first melt composition from the first outlet to the second inlet and feeding a further component to the side inlet and discharging the second melt composition from the second outlet, wherein the second screw is operated at a second screw speed smaller than the first screw speed and C) optionally forming the second melt composition into pellets.

Propylene-Based Polymer

The terms "polypropylene" and "propylene-based polymer" are herein used interchangeably. The propylene-based polymer may for example be a propylene homopolymer or a random propylene copolymer or a heterophasic propylene copolymer.

A propylene homopolymer can be obtained by polymerizing propylene under suitable polymerization conditions. A propylene copolymer can be obtained by copolymerizing propylene and one or more other α-olefins, preferably ethylene, under suitable polymerization conditions. The preparation of propylene homopolymers and copolymers is, for example, described in Moore, E. P. (1996) Polypropylene Handbook. Polymerization, Characterization, Properties, Processing, Applications, Hanser Publishers: New York.

The random propylene copolymer may comprise as the comonomer ethylene and/or an α-olefin chosen from the group of α-olefins having 4 to 10 C-atoms, preferably ethylene, 1-butene, 1-hexene or any mixtures thereof. The amount of the comonomer is preferably at most 10 wt % based on the random propylene copolymer, for example in the range from 2-7 wt % based on the random propylene copolymer.

Polypropylenes can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

Heterophasic propylene copolymers are generally prepared in one or more reactors, by polymerization of propylene in the presence of a catalyst and subsequent polymerization of an ethylene-α-olefin mixture. The resulting polymeric materials are heterophasic, but the specific morphology usually depends on the preparation method and monomer ratios used.

The heterophasic propylene copolymers can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; *Polypropylene and other Polyolefins*, by Ser van der Ven, Studies in Polymer Science 7, Elsevier 1990; WO06/010414, U.S. Pat. Nos. 4,399,054 and 4,472,524.

Preferably, the heterophasic propylene copolymer is made using Ziegler-Natta catalyst.

The heterophasic propylene copolymer may be prepared by a process comprising polymerizing propylene and optionally ethylene and/or α-olefin in the presence of a catalyst system to obtain the propylene-based matrix and subsequently polymerizing ethylene and α-olefin in the propylene-based matrix in the presence of a catalyst system to obtain the dispersed ethylene-αolefin copolymer.

These steps are preferably performed in different reactors. The catalyst systems for the first step and for the second step may be different or same.

The heterophasic propylene copolymer of the composition of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR, as well known in the art.

The propylene-based matrix consists of a propylene homopolymer and/or a propylene copolymer consisting of at least 70 wt % of propylene monomer units and at most 30 wt % of comonomer units selected from ethylene monomer units and α-olefin monomer units having 4 to 10 carbon atoms, for example consisting of at least 80 wt % of propylene monomer units and at most 20 wt % of the comonomer units, at least 90 wt % of propylene monomer units and at most 10 wt % of the comonomer units or at least 95 wt % of propylene monomer units and at most 5 wt % of the comonomer units, based on the total weight of the propylene-based matrix.

Preferably, the comonomer in the propylene copolymer of the propylene-based matrix is selected from the group of ethylene, 1-butene, 1-pentene, 4-methyl-1-pentene, 1-hexen, 1-heptene and 1-octene, and is preferably ethylene.

Preferably, the propylene-based matrix consists of a propylene homopolymer.

The melt flow index (MFI) of the propylene-based matrix (before the heterophasic propylene copolymer is mixed into the composition of the invention), $MFI_{PP}$, may be for example at least 0.1 dg/min, at least 0.2 dg/min, at least 0.3 dg/min, at least 0.5 dg/min, at least 1 dg/min, at least 1.5 dg/min, and/or for example at most 50 dg/min, at most 40 dg/min, at most 30 dg/min, at most 25 dg/min, at most 20 dg/min, measured according to ISO1133 (2.16 kg/230° C.). The $MFI_{PP}$ may be in the range of for example 0.1 to 50 dg/min, for example from 0.2 to 40 dg/min, for example 0.3 to 30 dg/min, for example 0.5 to 25 dg/min, for example from 1 to 20 dg/min, for example from 1.5 to 10 dg/min, measured according to ISO1133 (2.16 kg/230° C.).

The propylene-based matrix may e.g. be present in an amount of 50 to 95 wt %, based on the total heterophasic propylene copolymer. Preferably, the propylene-based matrix is present in an amount of 60 to 85 wt %, for example at least 65 wt % or at least 70 wt % and/or at most 78 wt %, based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.05 to 2.0 microns, as may be determined by transmission electron microscopy (TEM). The amount of the dispersed ethylene-α-olefin copolymer in the heterophasic propylene copolymer may herein be sometimes referred as RC.

The amount of ethylene monomer units in the ethylene-α-olefin copolymer may e.g. be 20 to 65 wt %. The amount of ethylene monomer units in the dispersed ethylene-α-olefin copolymer in the heterophasic propylene copolymer may herein be sometimes referred as RCC2.

The α-olefin in the ethylene-α-olefin copolymer is preferably chosen from the group of α-olefins having 3 to 8 carbon atoms. Examples of suitable α-olefins having 3 to 8 carbon atoms include but are not limited to propylene, 1-butene, 1-pentene, 4-methyl-1-pentene, 1-hexen, 1-heptene and 1-octene. More preferably, the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer.

The MFI of the dispersed ethylene α-olefin copolymer (before the heterophasic propylene copolymer is mixed into the composition of the invention), MFIrubber, may be for example at least 0.001 dg/min, at least 0.01 dg/min, at least 0.1 dg/min, at least 0.3 dg/min, at least 0.7 dg/min, at least 1 dg/min, and/or for example at most 30 dg/min, at most 20 dg/min, at most 15 dg/min at most 10 dg/min, at most 5 dg/min or at most 3 dg/min. The MFIrubber may be in the range for example from 0.001 to 30 dg/min, for example from 0.01 to 20 dg/min, for example 0.1 to 15 dg/min, for example 0.3 to 10 dg/min, for example from 0.7 to 5 dg/min, for example from 1 to 3 dg/min. MFIrubber is calculated according to the following formula:

$$MFIrubber = 10^{\wedge}\left(\frac{\text{Log } MFIheterophasic - \text{matrix content} * \text{Log } MFImatrix}{\text{rubber content}}\right)$$

wherein
    MFIheterophasic is the MFI (dg/min) of the heterophasic propylene copolymer measured according to ISO1133 (2.16 kg/230° C.), MFImatrix is the MFI (dg/min) of the propylene-based matrix measured according to ISO1133 (2.16 kg/230° C.), matrix content is the fraction of the propylene-based matrix in the heterophasic propylene copolymer, rubber content is the fraction of the dispersed ethylene-α-olefin copolymer in the heterophasic propylene copolymer. The sum of the matrix content and the rubber content is 1. For the avoidance of any doubt, Log in the formula means $\log_{10}$.

The dispersed ethylene-α-olefin copolymer is present in an amount of 50 to 5 wt % based on the total heterophasic propylene copolymer. Preferably, the dispersed ethylene-α-olefin copolymer is present in an amount of 40 to 15 wt %, for example in an amount of at least 22 wt % and/or for example in an amount of at most 35 wt % or at most 30 wt % based on the total heterophasic propylene copolymer.

In the heterophasic propylene copolymer in the composition of the invention, the sum of the total weight of the propylene-based matrix and the total weight of the dispersed ethylene-α-olefin copolymer is 100 wt % of the heterophasic propylene copolymer.

The propylene-based polymer may e.g. have a melt flow index determined according to ISO1133-1:2011 of 0.1 to 100 dg/min.

In some embodiments, the propylene-based polymer has a melt flow index determined according to ISO1133-1:2011 of 0.1 to 1.0 dg/min. The invention is especially advantageous in this case as the mixing of such low MFI polymer normally requires high shear leading to high heat causing degradation of the propylene-based polymer.

In the polypropylene composition produced according to the invention, the amount of the propylene-based polymer with respect to the polypropylene composition is preferably at least 30 wt %, preferably 40 to 95 wt %, for example 50 to 90 wt % or 55 to 85 wt %.

Further Polymer

The polypropylene composition is produced according to the invention by mixing the propylene-based polymer with other components. The other components may or may not include further polymers which are not a propylene-based polymer.

Accordingly, in some embodiments, step A) involves feeding a further polymer to the first inlet.

The amount of the further polymer with respect to the polypropylene composition is typically smaller than the amount of the propylene-based polymer with respect to the polypropylene composition. In the polypropylene composition produced according to the invention, the amount of the further polymer with respect to the polypropylene composition is preferably 0 to 30 wt %, for example 1 to 20 wt % or 2 to 10 wt %.

The further polymer may be any type of polymer, but is preferably a polyolefin, particularly preferably a polyethylene. The polyethylene may be selected from the group consisting of high density polyolefin (HDPE), linear low-density polyethylene (LLDPE), low-density polyethylene (LDPE) and ultrahigh molecular weight polyethylene (UHMwPE).

The production processes of HDPE, LLDPE and LDPE are summarised in Handbook of Polyethylene by Andrew Peacock (2000; Dekker; ISBN 0824795466) at pages 43-66.
HDPE The HDPE may be an ethylene homopolymer or may comprise a comonomer, for example butene or hexene.

Preferably, the HDPE has a density of 940-960 kg/m³, more preferably 940-955 kg/m³, measured according to ISO1183.

Preferably, the HDPE has a Melt Flow Rate of 0.1-4 g/10 min, more preferably 0.1-1 g/10 min, measured according to ISO1133-1:2011 (190° C./5 kg).
LLDPE The technologies suitable for the LLDPE manufacture include gas-phase fluidized-bed polymerization, polymerization in solution, polymerization in a polymer melt under very high ethylene pressure, and slurry polymerization.

The LLDPE comprises ethylene and a C3-C10 alpha-olefin comonomer (ethylene-alpha olefin copolymer). Suitable alpha-olefin comonomers include 1-butene, 1-hexene, 4-methyl pentene and 1-octene. The preferred co monomer is 1-hexene. Preferably, the alpha-olefin co monomer is present in an amount of about 5 to about 20 percent by weight of the ethylene-alpha olefin copolymer, more preferably an amount of from about 7 to about 15 percent by weight of the ethylene-alpha olefin copolymer.

Preferably, the LLDPE has a density of 900-948 kg/m³, more preferably 915-935 kg/m³, more preferably 920-935 kg/m³, determined according to ISO1872-2.

Preferably, the LLDPE has a Melt Flow Rate of 0.1-3.0 g/10 min, more preferably 0.3-3.0 g/10 min, determined according to ISO1133-1:2011 (190° C./2.16 kg).
LDPE The LDPE may be produced by use of autoclave high pressure technology and by tubular reactor technology.

LDPE may be an ethylene homopolymer or may comprise a comonomer, for example butene or hexene.

Preferably, the LDPE has a density of 916-940 kg/m³, more preferably 920-935 kg/m³, determined according to ISO1872-2.

Preferably, the LDPE has a Melt Flow Rate of 0.1-3.0 g/10 min, more preferably 0.3-3.0 g/10 min, determined according to ISO1133-1:2011 (190° C./2.16 kg).
UHMwPE The UHMwPE is a substantially linear polyethylene which has a relative viscosity of 1.44 or greater, at a concentration of 0.02%, at 135° C., in decahydronaphthalene. UHMwPE is described further in ASTM D4020 2011.z

Additives

In some embodiments, step A) involves feeding additives to the first inlet.

In the polypropylene composition produced according to the invention, the amount of the additives with respect to the polypropylene composition is preferably 0 to 30 wt %, for example 1 to 20 wt % or 2 to 10 wt %.

Preferably, the additives comprise at least one selected from the group consisting of flame retardants, nucleating agents and clarifiers, stabilizers, release agents, peroxides, plasticizers, anti-oxidants, lubricants, antistatics, cross linking agents, scratch resistance agents, pigments and/or colorants, impact modifiers, blowing agents, acid scavengers, recycling additives, coupling agents, anti-microbials, anti-fogging additives, slip additives, anti-blocking additives and polymer processing aids.

Preferably, the additives comprises an impact modifier which is an elastomer of ethylene and α-olefin comonomer having 4 to 8 carbon atoms. Advantageously, the process according to the invention results in a higher impact strength due to a better mixing and less degradation.

The elastomer may for example have a density in the range from 0.850 to 0.915 g/cm³. Such elastomers are sometimes also referred to as plastomers.

The α-olefin comonomer in the elastomer is preferably an acyclic monoolefin such as 1-butene, 1-pentene, 1-hexene, 1-octene, or 4-methylpentene Accordingly, the elastomer is preferably selected from the group consisting of ethylene-1-butene copolymer, ethylene-1-hexene copolymer, ethylene-1-octene copolymer and mixtures thereof, more preferably wherein the elastomer is selected from ethylene-1-octene copolymer. Most preferably, the elastomer is an ethylene-1-octene copolymer.

Preferably, the density of the elastomer is at least 0.865 g/cm³ and/or at most 0.910 g/cm³. For example, the density of the elastomer is at least 0.850, for example at least 0.865, for example at least 0.88, for example at least 0.90 and/or for example at most 0.915, for example at most 0.910, for example at most 0.907, for example at most 0.906 g/cm³. More preferable the density of the elastomer is in the range from 0.88 up to an including 0.907 g/cm³, most preferably, the density of the elastomer is in the range from 0.90 up to and including 0.906 g/cm³.

Elastomers which are suitable for use in the current invention are commercially available for example under the trademark EXACT™ available from Exxon Chemical Company of Houston, Texas or under the trademark ENGAGE™ polymers, a line of metallocene catalyzed plastomers available from Dow Chemical Company of Midland, Michigan or under the trademark TAFMER™ available from MITSUI Chemicals Group of Minato Tokyo or under the trademark Nexlene™ from SK Chemicals.

The elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomer s may also be prepared using traditional types of heterogeneous multi-sited Ziegler-Natta catalysts.

Preferably, the elastomer has a melt flow index of 0.1 to 40 dg/min (ISO1133, 2.16 kg, 190° C.), for example at least 1 dg/min and/or at most 35 dg/min. More preferably, the elastomer has a melt flow index of at least 1.5 dg/min, for example of at least 2 dg/min, for example of at least 2.5 dg/min, for example of at least 3 dg/min, more preferably at least 5 dg/min and/or preferably at most 30 dg/min, more preferably at most 20 dg/min, more preferably at most 10 dg/min measured in accordance with ISO 1133 using a 2.16 kg weight and at a temperature of 190° C.

Preferably, the amount of ethylene incorporated into the elastomer is at least 50 mol %. More preferably, the amount of ethylene incorporated into the elastomer is at least 57 mol %, for example at least 60 mol %, at least 65 mol % or at least 70 mol %. Even more preferably, the amount of ethylene incorporated into the elastomer is at least 75 mol %. The amount of ethylene incorporated into the elastomer may typically be at most 97.5 mol %, for example at most 95 mol % or at most 90 mol %.

In the polypropylene composition produced according to the invention, the amount of the elastomer of ethylene and α-olefin comonomer having 4 to 8 carbon atoms with respect to the polypropylene composition is preferably 0 to 30 wt %, for example 1 to 20 wt % or 2 to 10 wt %.

Further Component

One or more further components is fed to the side inlet port of the mixing section to be mixed with the first melt composition. The mixing section may have one, two, three or more side inlet ports. Different components may be fed to the same or different side inlet ports.

In the polypropylene composition produced according to the invention, the amount of the further component fed to the side inlet port of the mixing section with respect to the polypropylene composition is preferably 1 to 70 wt %, for example 2 to 40 wt % or 3 to 30 wt %.

The further component may be of various types, for example glass fibers, a flame retardant, in particular an organic flame retardant, and fillers such as talc, such as a surface-modified talc.

The process according to the invention allows producing a composition having improved properties at a high throughput since the breakage or degradation of the further component fed to the side inlet port during mixing is prevented.

In some embodiments, the further component comprises glass fibers. Due to the low screw speed in the mixing section, fibe breakage of the glass fibers is prevented, leading to improved mechanical properties of the composition obtained.

In some embodiments, the further component comprises a flame retardant, in particular an organic flame retardant. Due to the low screw speed in the mixing section, degradation of the flame retardant, in particular the organic flame retardant, due to overheating is prevented, leading to improved flame retardancy.

In some embodiments, the further component comprises a surface-modified talc. A surface-modified talc is a talc coated with an organic compound such as are silanes, amides, glycols, stearates, sorbates and titanates. Surface-modified talcs are known to the person skilled in the art and are commercially available from for example Imerys Luzenac. Due to the low screw speed in the mixing section, degradation of the organic compound is prevented, avoiding generation of unpleasant smell.

In the polypropylene composition produced according to the invention, when the further component comprises glass fibers, the amount of the glass fibers with respect to the polypropylene composition is preferably 5 to 50 wt %, for example 10 to 40 wt % or 15 to 35 wt %.

In the polypropylene composition produced according to the invention, when the further component comprises (organic) flame retardant, the amount of the (organic) flame retardant with respect to the polypropylene composition is preferably 5 to 50 wt %, for example 10 to 40 wt % or 15 to 35 wt %.

In the polypropylene composition produced according to the invention, when the further component comprises fillers, the amount of the fillers with respect to the polypropylene composition is preferably 5 to 50 wt %, for example 10 to 40 wt % or 15 to 35 wt %.

In some embodiments, the end portion having the second inlet port may be further provided with an inlet for receiving additives such as color masterbatch before (further away from the second outlet port) the second inlet port. In this case, these additives are also mixed with the first melt composition in the mixing section of the extruder according to the invention, forming part of the second melt composition.

Other Aspects

The invention further provides the polymer composition obtained by or obtainable by the process according to the invention.

According to the process according to the invention, the polypropylene composition is provided in the form of the second melt composition. In some embodiments, the process according to the invention further comprises the step C): forming the second melt composition into pellets. Thus the polypropylene composition according to the invention is provided in the form of the pellets.

The pellets may be moulded into (semi-)finished articles. Suitable examples of moulding processes include injection moulding, compression moulding, extrusion and extrusion compression moulding.

The invention further provides an article comprising the polymer composition. For example, the article may be selected from the group consisting of a pipe, an automotive exterior part, an automotive interior part, a battery casing in an automotive, a household appliance and a building and construction article.

Preferably, the polypropylene composition has a smell value as determined by VDA270 of at most 4.0.

It is noted that the invention relates to the subject-matter defined in the independent claims alone or in combination with any possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following FIGURE and examples, without however being limited thereto.

The FIGURE illustrates an embodiment of the compounding extruder according to the invention. The extruder comprises a melting section 100 and a mixing section 200.

The melting section 100 comprises a first elongated cylindrical tube and a first screw (not shown) arranged in the first elongated cylindrical tube.

The first elongated cylindrical tube has an end portion having a first inlet port 101 and an end portion having a first outlet port 102. The first elongated cylindrical tube is further provided with a vacuum degassing section 103 between the first inlet port 101 and the first outlet port 102.

The first inlet port 101 is configured to receive, in operation, a propylene-based polymer, optional additives and an optional further polymer. The first outlet port 102 is configured to discharge, in operation, a first melt composition comprising components added to the inlet port 101.

The first melt composition discharged from the first outlet port 102 is transferred to the melting section 200 by a heated transition piece.

The mixing section 200 comprises a second elongated cylindrical tube and a second screw (not shown) arranged in the second elongated cylindrical tube.

The second elongated cylindrical tube has an end portion having a second inlet port 201 and an end portion having a second outlet port 202. The second inlet port is configured to receive, in operation, the first melt composition from the first outlet port.

The second elongated cylindrical tube further has an inlet port 203 before the second inlet port, which is configured to receive, in operation, additives, for example color masterbatch.

The second elongated cylindrical tube further has three side inlet ports 204, 205 and 206 between the second inlet port 201 and the second outlet port 202. For example, the inlet ports 204 and 205 may be configured to receive, in operation, fillers such as talc and a flame retardant and the inlet port 206 may be configured to receive, in operation, glass fibers.

The second elongated cylindrical tube is further provided with a vacuum degassing section 207 between the first side inlet port 206 and the second outlet port 202.

The second outlet port 202 is configured to discharge, in operation, a second melt composition comprising components added to the inlet ports 203, 201, 204, 205 and 206.

The second melt composition extruded from the second outlet port 202 is solidified and cut into pellets.

Referring to the reference signs mentioned above, the compounding extruder according to the invention is:

A compounding extruder for producing a propylene-based polymer composition, comprising
   a) a melting section (100) comprising
      ai) a first elongated cylindrical tube having
         an end portion having a first inlet port (101) configured to receive, in operation, a propylene-based polymer and optional additives and
         an end portion having a first outlet port (102) configured to discharge, in operation, a first melt composition comprising a melt of the propylene-based polymer and the optional additives and
      aii) a first screw arranged in the first elongated cylindrical tube and having a first length L1, a first outer screw diameter Do1 and a first inner screw diameter Di1 configured to, in operation, convey the propylene-based polymer and the optional additives to the first outlet port (102) and
   b) a mixing section (200) comprising
      bi) a second elongated cylindrical tube having
         an end portion having a second inlet port (201) configured to receive, in operation, the first melt composition from the first outlet port (102),
         an end portion having a second outlet port (202) and
         a side inlet port (204, 205, 206) between the second inlet port (201) and the second outlet port (202) configured to, in operation, receive a further component,
         wherein the second outlet port (202) is configured to discharge, in operation, a second melt composition comprising the first melt composition and the further component and
      bii) a second screw arranged in the second elongated cylindrical tube and having a second length L2, a second outer screw diameter Do2 and a second inner screw diameter Di2 configured to, in operation, convey the first melt composition and the further component to the second outlet port (202),
   wherein the first screw and the second screw are operable at different screw speeds, wherein Do1 is 0.82 to 1.2×Do2.

EXPERIMENTS

Various compositions were made using the following two types of compounding extruders.

Conventional extruder: a compounding extruder having a screw length of 58 L/D, an outer screw diameter of 65 mm and an inner screw diameter of 44.5 mm, 2 side inlet ports, atmospheric degassing and vacuum degassing Extruder according to the invention: a compounding extruder having a melting section having a first screw having a first length of 30 L1/Do1, a first outer screw diameter Do1 of 65 mm and a first inner screw diameter Di1 of 44.5 mm and a mixing section having a second screw having a second length of 58 L2/Do2, a second outer screw diameter Do2 of 65 mm and a second inner screw diameter Di2 of 39.5 mm, 2 side inlet ports, atmospheric degassing and vacuum degassing Do1=1.0×Do2

Do1/Di1=1.46

Do2/Di2=1.65

Do1/Di1=0.89×Do2/Di2

Material properties were measured by the following methods:

Izod impact strength according to ISO 180/1A (II) at 23° C. and 0° C.

Charpy impact strength according to ISO179/1eA (II) at 23° C., 0° C. and −20° C.

Smell according to VDA270

Experiment Set A: PP Compounds (Talc Filled PP) with External Elastomer

Following materials were used:

PP1: polypropylene copolymer having an MFI of 33 dg/min (ISO 1133 at 230° C./2.16 kg)

HDPE: high density polyethylene having an MFI of 8 dg/min (ASTM D 1238 at 190° C./2.16 kg)

Elastomer: ethylene based α-olefin elastomer

Comparative Experiment 1 (Conventional Extruder)

100 wt part of PP1, 13 wt part of HDPE, 10 wt part of elastomer, 5 wt part of color masterbatch and 2 wt part of other additives were fed to the inlet of the conventional extruder.

32 wt part of fine talc was fed to the 2 side inlet ports of the extruder and the mixture was melt-mixed. The screw was operated at a screw speed of 600 rpm. A PP composition was obtained at a throughput of 1000 kg/h

Example 2 (Extruder According to the Invention)

100 wt part of PP1, 13 wt part of HDPE, 10 wt part of Elastomer, 5 wt part of color masterbatch and 2 wt part of other additives were fed to the inlet of the melting section of the extruder according to the invention.

32 wt part of fine talc was fed to the 2 side inlet ports of the mixing section of the extruder according to the invention and the mixture was melt-mixed. The screw in the melting section was operated at a screw speed of 600 rpm. The screw in the mixing section was operated at a screw speed of 375 rpm. A PP composition was obtained at a throughput of 1000 kg/h.

Properties of the PP compositions obtained were measured, shown below.

It can be understood that the composition of Example 2 made using the extruder according to the invention has a higher impact strength and a lower smell compared to the composition of comparative experiment 1 made using the conventional extruder.

Experiment Set B: Short Glass Fiber (SGF) Reinforced PP Compounds

Following materials were used:

PP2: polypropylene homopolymer having an MFI of 47 dg/min (ISO 1133 at 230° C./2.16 kg)

SGF: chopped short glass fiber 4 mm, ∅=13 µm

Coupling agent: Maleic anhydride functionalized homopolypropylene

Comparative Experiment 3 (Conventional Extruder)

100 wt part of PP2, 4 wt part of coupling agent, 2 wt part of color masterbatch and 1.5 wt part of other additives were fed to the inlet of the conventional extruder.

71 wt part of SGF was fed to the second side inlet port of the extruder and the mixture was melt-mixed. The screw was operated at a screw speed of 400 rpm. A PP composition was obtained at a throughput of 500 kg/h

Example 4 (Extruder According to the Invention)

100 wt part of PP2, 4 wt part of coupling agent, 2 wt part of color masterbatch and 1.5 wt part of other additives were fed to the inlet of the melting section of the extruder according to the invention.

71 wt part of SGF was fed to the second side inlet port of the mixing section of the extruder according to the invention and the mixture was melt-mixed. The screw in the melting section was operated at a screw speed of 400 rpm. The screw in the mixing section was operated at a screw speed of 200 rpm. A PP composition was obtained at a throughput of 600 kg/h.

Properties of the PP compositions obtained were measured, shown below.

| | Izod 0° C. [kJ/m²] | Izod 23° C. [kJ/m²] | Char-py −20° C. [kJ/m²] | Char-py 0° C. [kJ/m²] | Char-py 23° C. [kJ/m²] | Smell* |
|---|---|---|---|---|---|---|
| CEx 1 (conventional extruder) | 4.5 | 10.1 | 2.86 | 4.74 | 8.57 | 3.83 |
| Ex 2 (inventive extruder) | 5.1 | 11.5 | 2.86 | 5.41 | 10.96 | 3.44 |

*An average value of the values determined by panelists according to VDA270 before rounding.

| | Izod 0° C. [kJ/m²] | Izod 23° C. [kJ/m²] | Char-py −20° C. [kJ/m²] | Char-py 0° C. [kJ/m²] | Char-py 23° C. [kJ/m²] | Smell* |
|---|---|---|---|---|---|---|
| CEx 3 (conventional extruder) | 9.3 | 9.3 | 9.54 | 8.85 | 9.69 | 4.06 |
| Ex 4 (inventive extruder) | 10.9 | 12.2 | 10.28 | 10.65 | 11.9 | 3.88 |

*An average value of the values determined by panelists according to VDA270 before rounding.

It can be understood that the composition of Example 4 made using the extruder according to the invention has a higher impact strength and a lower smell compared to the composition of comparative experiment 3 made using the conventional extruder.

Experiment Set C: Flame Retardant Short Glass Fiber (SGF) Reinforced PP Compounds Following materials were used:
PP2: polypropylene homopolymer having an MFI of 47 dg/min (ISO 1133 at 230° C./2.16 kg)
FR: nitrogen-phosphorus based flame retardant
SGF: chopped short glass fiber 4 mm, $\varnothing$=13 μm
Coupling agent: Maleic anhydride functionalized homopolypropylene

Comparative Experiment 5 (Conventional Extruder)

100 wt part of PP2, 7 wt part of coupling agent, 5 wt part of color masterbatch and 2 wt part of other additives were fed to the inlet of the conventional extruder.

45 wt part of FR was fed to the $1^{st}$ side inlet port of the extruder and 68 wt part of SGF was fed to the $2^{nd}$ side inlet port of the extruder and the mixture was melt-mixed. The screw was operated at a screw speed of 400 rpm. A PP composition was obtained at a throughput of 500 kg/h.

Example 6 (Extruder According to the Invention)

100 wt part of PP2, 7 wt part of coupling agent, 5 wt part of color masterbatch and 2 wt part of other additives were fed to the inlet of the melting section of the extruder according to the invention.

45 wt part of FR was fed to the $1^{st}$ side inlet port of the mixing section of the extruder according to the invention and 68 wt part of SGF was fed to the $2^{nd}$ side inlet port of the mixing section of the extruder according to the invention and the mixture was melt-mixed. The screw in the melting section was operated at a screw speed of 400 rpm. The screw in the mixing section was operated at a screw speed of 280 rpm. A PP composition was obtained at a throughput of 500 kg/h.

Properties of the PP compositions obtained were measured, shown below.

| | Izod 0° C. [kJ/m²] | Izod 23° C. [kJ/m²] | Char-py −20° C. [kJ/m²] | Char-py 0° C. [kJ/m²] | Char-py 23° C. [kJ/m²] | |
|---|---|---|---|---|---|---|
| CEx 5 (conventional extruder) | 9.3 | 9.3 | 9.54 | 8.85 | 9.69 | |
| Ex 6 (inventive extruder) | 10.9 | 12.2 | 10.28 | 10.65 | 11.9 | |

It can be understood that the composition of Example 6 made using the extruder according to the invention has a higher impact strength compared to the composition of comparative experiment 5 made using the conventional extruder.

Additionally, glow wire flammability tests according to NEN-EN-IEC 60695-2-12:2014 were performed. Results are shown below.

| | GWFI (Glow Wire Flammability Index) 0.8 mm | GWIT (Glow Wire Ignition Temperature) 0.8 mm |
|---|---|---|
| CEx 5 (conventional extruder) | 800 | 825 |
| Ex 6 (inventive extruder) | 850 | 850 |

It can be understood that the composition of Example 6 made using the extruder according to the invention has a better flame retardancy compared to the composition of comparative experiment 5 made using the conventional extruder.

In the compounding extruder according to the invention, Do1=1.0×Do2 and Do1/Di1=0.89×Do2/Di2. This means that the first screw has a free volume which is smaller than the second screw but the difference is not very large. This allowed the first screw and the second screw to be operated at optimum speeds: The first screw is operated at a higher screw speed than that of the second screw but the difference in the screw speeds is not very large. The first screw is operated at a high screw speed which allows a high throughput while preventing degradation in the melting section and the mixing section. Accordingly, polypropylene compositions with good properties were obtained at high throughputs by the use of the compounding extruder according to the invention.

The invention claimed is:

1. A compounding extruder for producing a propylene-based polymer composition, comprising
    a) a melting section comprising
        ai) a first elongated cylindrical tube having
            an end portion having a first inlet port configured to receive, in operation, a propylene-based polymer and optional additives and
            an end portion having a first outlet port configured to discharge, in operation, a first melt composition comprising a melt of the propylene-based polymer and the optional additives and
        aii) a first screw arranged in the first elongated cylindrical tube and having a first length L1, a first outer screw diameter Do1 and a first inner screw diameter Di1 configured to, in operation, convey the propylene-based polymer and the optional additives to the first outlet port and b) a mixing section comprising bi) a second elongated cylindrical tube having an end portion having a second inlet port configured to receive, in operation, the first melt composition from the first outlet port, an end portion having a second outlet port and a side inlet port between the second inlet port and the second outlet port configured to, in operation, receive a further component, and reduce the risk of degradation of the further component compared to the further component being added upstream of the second inlet port, wherein the second outlet port is configured to discharge, in operation, a second melt composition comprising the first melt composition and the further component and bii) a second screw arranged in the second elongated cylindrical tube and having a second length L2, a second outer screw diameter Do2 and a second inner screw diameter Di2 configured to, in operation, convey the first melt composition and the further component to the second outlet, wherein the first screw and the second screw are operable at different screw speeds, wherein Do1 is 0.82 to 1.2×Do2, wherein Do1/Di1=0.8 to 1.0×Do2/Di2.

2. The compounding extruder according to claim 1, wherein Do1 is at least 0.85×Do2.

3. The compounding extruder according to claim 1, wherein Do1 is at most 1.0×Do2.

4. The compounding extruder according to claim 1, wherein Do1/Di1 is 1.4 to 2.1.

5. The compounding extruder according to claim 1, wherein Do2/Di2 is 1.4 to 2.1.

6. The compounding extruder according to claim 1, wherein L1/Do1 is 10 to 100.

7. The compounding extruder according to claim 1, wherein L2/Do2 is 30 to 100.

8. The compounding extruder according to claim 1, wherein the mixing section comprises two or more side inlet ports between the second inlet port and the second outlet port.

9. The compounding extruder accordingly to claim 8, wherein the side inlet ports are each configured to receive different components.

10. The compounding extruder according to claim 1, wherein Do1 is 1.0 to 1.2×Do2.

11. The compounding extruder according to claim 1, wherein Do1 is 1.0×Do2.

12. A compounding extruder for producing a propylene-based polymer composition, comprising a) a melting section comprising ai) a first elongated cylindrical tube having an end portion having a first inlet port configured to receive, in operation, a propylene-based polymer and optional additives and an end portion having a first outlet port configured to discharge, in operation, a first melt composition comprising a melt of the propylene-based polymer and the optional additives and aii) a first screw arranged in the first elongated cylindrical tube and having a first length L1, a first outer screw diameter Do1 and a first inner screw diameter Di1 configured to, in operation, convey the propylene-based polymer and the optional additives to the first outlet port and b) a mixing section comprising bi) a second elongated cylindrical tube having an end portion having a second inlet port configured to receive, in operation, the first melt composition from the first outlet port, an end portion having a second outlet port, a side inlet port between the second inlet port and the second outlet port configured to, in operation, receive a further component, and reduce the risk of degradation of the further component compared to the further component being added upstream of the second inlet port, and a vacuum degassing section between the side inlet port and the second outlet port, wherein the second outlet port is configured to discharge, in operation, a second melt composition comprising the first melt composition and the further component and bii) a second screw arranged in the second elongated cylindrical tube and having a second length L2, a second outer screw diameter Do2 and a second inner screw diameter Di2 configured to, in operation, convey the first melt composition and the further component to the second outlet, wherein the first screw and the second screw are operable at different screw speeds, wherein Do1 is 0.82 to 1.2×Do2, wherein Do1/Di1=0.8 to 1.0×Do2/Di2.

13. A compounding extruder for producing a propylene-based polymer composition, comprising a) a melting section comprising ai) a first elongated cylindrical tube having an end portion having a first inlet port configured to receive, in operation, a propylene-based polymer and optional additives and an end portion having a first outlet port configured to discharge, in operation, a first melt composition comprising a melt of the propylene-based polymer and the optional additives and aii) a first screw arranged in the first elongated cylindrical tube and having a first length L1, a first outer screw diameter Do1 and a first inner screw diameter Di1 configured to, in operation, convey the propylene-based polymer and the optional additives to the first outlet port and b) a mixing section comprising bi) a second elongated cylindrical tube having an end portion having a second inlet port configured to receive, in operation, the first melt composition from the first outlet port, an end portion having a second outlet port and a side inlet port between the second inlet port and the second outlet port configured to, in operation, receive a further component, wherein the second outlet port is configured to discharge, in operation, a second melt composition comprising the first melt composition and the further component and bii) a second screw arranged in the second elongated cylindrical tube and having a second length L2, a second outer screw diameter Do2 and a second inner screw diameter Di2 configured to, in operation, convey the first melt composition and the further component to the second outlet, wherein the first screw and the second screw are operable at different screw speeds, wherein Do1 is 0.82 to 1.2×Do2, wherein Do1/Di1=0.8 to 1.0×Do2/Di2, and wherein the compounding extruder is configured to produce a polypropylene composition having a smell value as determined by VDA270 of at most 4.0.

* * * * *